United States Patent [19]

Bell et al.

[11] Patent Number: 4,945,501

[45] Date of Patent: Jul. 31, 1990

[54] METHOD FOR DETERMINING POSITION WITHIN THE MEASURING VOLUME OF A COORDINATE MEASURING MACHINE AND THE LIKE AND SYSTEM THEREFOR

[75] Inventors: Frederick K. Bell, Centerville; Stephen N. Brown; Michael T. Gale, both of Dayton, all of Ohio

[73] Assignee: The Warner & Swasey Company, Cleveland, Ohio

[21] Appl. No.: 338,378

[22] Filed: Apr. 12, 1989

Related U.S. Application Data

[63] Continuation of Ser. No. 4,435, Jan. 20, 1987, abandoned.

[51] Int. Cl.⁵ .................. G01C 25/00; G06F 15/46; G05D 23/275
[52] U.S. Cl. ................... 364/571.05; 318/632; 364/560; 364/474.35; 364/167.01; 33/503; 33/505; 33/556
[58] Field of Search ............. 364/571.05, 571.04, 364/167.01, 164, 474.35, 550, 551.02, 559–563; 33/503, 505, 545, 546, 553–558; 318/632

[56] References Cited

U.S. PATENT DOCUMENTS

| | | | |
|---|---|---|---|
| 3,528,481 | 9/1970 | Lund | 164/183 |
| 3,555,254 | 1/1971 | Gerber | 318/632 |
| 4,190,097 | 2/1980 | Allread et al. | 164/343 |
| 4,370,720 | 1/1983 | Hyatt | 364/474 |
| 4,422,150 | 12/1983 | Keller et al. | 364/553 X |
| 4,437,151 | 3/1984 | Hurt et al. | 364/571 |
| 4,462,082 | 7/1984 | Thiele et al. | 364/507 |
| 4,499,546 | 2/1985 | Kuga et al. | 364/474.35 |
| 4,550,418 | 10/1985 | Deis | 364/561 X |
| 4,558,424 | 12/1985 | Oguchi et al. | 364/474.35 X |
| 4,577,285 | 3/1986 | Bailey | 33/504 X |
| 4,582,026 | 4/1986 | Takita et al. | 364/164 X |
| 4,583,159 | 4/1986 | Kanemoto et al. | 364/571 X |
| 4,587,622 | 5/1986 | Herzog | 364/474 X |
| 4,590,580 | 5/1986 | Takezawa | 364/571 |
| 4,603,487 | 8/1986 | Matsunata | 33/556 X |
| 4,625,408 | 12/1986 | Wright | 33/1M |
| 4,628,441 | 12/1986 | Johnstone et al. | 364/167.01 |
| 4,633,422 | 12/1986 | Brauer | 364/571 |
| 4,663,852 | 5/1987 | Guarini | 33/503 X |
| 4,677,755 | 7/1987 | Iwano et al. | 33/503 |
| 4,703,443 | 10/1987 | Moriyasu | 364/559 |
| 4,754,417 | 6/1988 | Beeson et al. | 33/504 X |
| 4,769,763 | 9/1988 | Trieb et al. | 33/503 |
| 4,792,228 | 12/1988 | Haffner | 356/400 X |
| 4,835,718 | 5/1989 | Breyer et al. | 364/474.35 X |
| 4,866,643 | 9/1989 | Dutler | 364/560 X |
| 4,884,889 | 12/1989 | Beckwith, Jr. | 33/503 X |

FOREIGN PATENT DOCUMENTS

| | | |
|---|---|---|
| 2739527 | 10/1978 | Fed. Rep. of Germany . |
| 1173313 | 2/1959 | France . |
| 1350652 | 12/1963 | France . |
| 216942A | 2/1986 | United Kingdom . |

OTHER PUBLICATIONS

"Error Compensation of Coordinate Measuring Machines" dated Jan. 1985, and published in the Annals of CIRP by G. Zhang et al.

Primary Examiner—Parshotam S. Lall
Assistant Examiner—Joseph L. Dixon
Attorney, Agent, or Firm—David R. Syrowik; Raymond J. Eifler

[57] ABSTRACT

Axis correction or machine charateristic data is stored (108) in memory (110) within a control or measurement processor (36) of a CMM (10) (FIG. 8). The axis correction data includes error data representing 21 different geometry errors (FIG. 4A through 4C) of the CMM. As position information is required, the measurement processor captures the actual position signal from each machine axis sensor and uses this position signal to locate (112) a set of the axis correction data which describes the machine characteristics at that position. The measurement processor then mathematically combines (114) (FIG. 9) the position signal with the subset of axis correction data to obtain a corrected position signal having a corrected set of cooridinate values which describe the probe position in a true Cartesian coordinate system.

8 Claims, 8 Drawing Sheets

Fig. 2
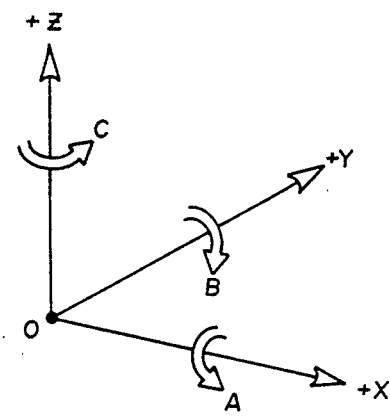
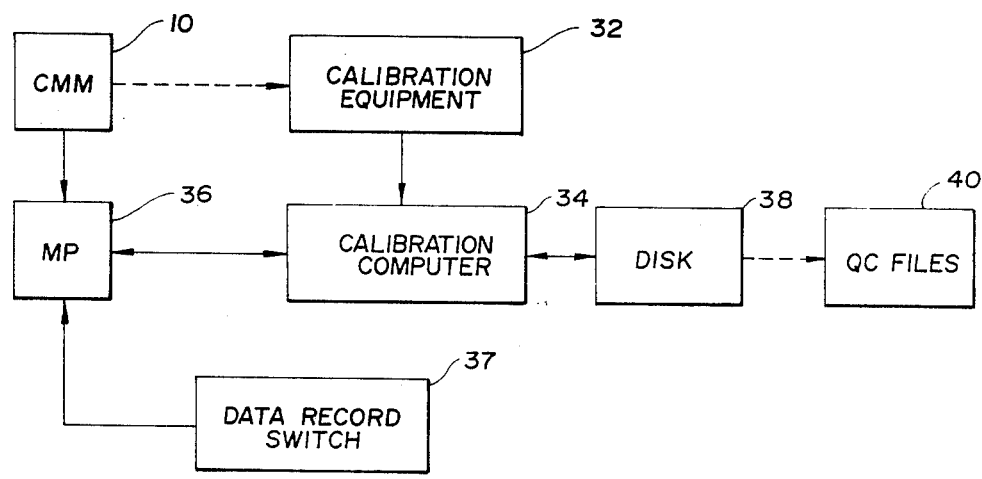
Fig. 3

$$\begin{cases} X_C = X_{MP} + X(x) + X(z) + X(y) + Z\left[B(x) + B(y) + P_{zx}\right] - Y\left[C(x) + P_{yx}\right] \\ \quad + S_z\left[B(x) + B(y) + B(z)\right] - S_y\left[C(x) + C(y) + C(z)\right] \\ \\ Y_C = Y_{MP} + Y(y) + Y(x) + Y(z) - Z\left[A(x) + A(y) + P_{zy}\right] \\ \quad + S_x\left[C(x) + C(y) + C(z)\right] - S_z\left[A(x) + A(y) + A(z)\right] \\ \\ Z_C = Z_{MP} + Z(z) + Z(y) + Z(x) + Y \cdot A(x) \\ \quad + S_y\left[A(x) + A(y) + A(z)\right] - S_x\left[B(x) + B(y) + B(z)\right] \end{cases}$$

*Fig. 9*

METHOD FOR DETERMINING POSITION WITHIN THE MEASURING VOLUME OF A COORDINATE MEASURING MACHINE AND THE LIKE AND SYSTEM THEREFOR

This is a continuation of co-pending application Ser. No. 004,435 filed on Jan. 20, 1987, now abandoned.

This invention relates to method and system for determining position within the measuring volume of a coordinate measuring machine (CMM) and, in particular, to method and system for determining position within the measuring volume of a CMM whereby the CMM is calibrated so that it is capable of determining position for its entire measuring volume.

With the advent of numerically controlled machine tools, the demand has grown for a means to support this equipment with faster first-piece inspection and, in many cases, 100% dimensional inspection. To fill this need, the CMM was developed in the early 1960's. A CMM can also be used as a layout machine before machining and for checking feature locations after machining. In many cases the CMM plays a vital role in the mechanization of the inspection process.

Since its development, the CMM has been increasingly used throughout the automotive and aerospace industries. Although it was once considered an exotic tool for ensuring quality control, the CMM is now becoming a mandatory piece of equipment for both the large manufacturing plant and the small job shop. This is primarily due to the need for an accurate measuring instrument and detailed documentation of the components being produced.

Currently, the CMM is being used in one of three ways in manufacturing. The simplest approach is to place the CMM at the end of the production line or in an inspection area. With this approach, the CMM is used to inspect the first part of a production run to verify the machine setup. Once the setup is verified, it then measures parts on a random basis. For many applications, this permits the best approach to inspection.

Another approach is to incorporate the CMM between two work centers and then measure 100% of the parts produced at the first center before any secondary operations are performed at the second work center. This approach is possible because CMMs are capable of measuring three-dimensional geometry and making many different measurements within a short period of time. When this approach is used, the CMM indirectly controls the production process. In this setting, however, the CMM must be "hardened" to perform in the shop environment for part inspection.

A third approach integrates the CMM into the production line. This permits the CMM to directly control the production process. In operation, an integrated system would measure the workpiece, compare the measurements with required dimensions and, if necessary, automatically adjust the machine controls so that the part is manufactured within the required specifications.

A basic CMM consists of four elements: (1) the machine structure, which basically is an X-Y-Z positioning device; (2) the probing system used to detect part surfaces and provide input to a control system; (3) the control system including a machine control and computer hardware; and (4) the software for three-dimensional geometry analysis. The measuring envelope or volume is defined by the X, Y and Z travel of the machine.

Although a variety of machine designs and configurations exist, all designs incorporate the same fundamental concept of three coordinate axes. Each axis is ideally square in its own relationship to the reference plane created by the other two axes. Each axis is fitted with a linear measurement transducer for positional feedback. This allows position displays within the envelope to be independent of any fixed reference point.

The most common reference systems in use are steel and glass scales. Both systems utilize noncontact, electro-optical reader heads for determining the exact position of the machine. Steel reference systems are widely used in shop environments because the difference in the coefficient of expansion between the steel scale and workpiece is minimal. Glass scale reference systems are generally used in controlled environments because of the difference in the coefficient of expansion between glass and the metal workpiece.

The worktable of the machine generally contains tapped holes to facilitate the clamping and locating of parts. It may be made from granite or steel because of its stability in various environments.

Electronic or solid probes are inserted into the probe arm or shaft, which is supported by cantilever, bridge gantry, column members or other CMM types. Probe arm movement is guided by means of frictionless air bearings or mechanical bearings.

Coordinate measuring is typically a two or three-dimensional process that determines the position of holes, surfaces, centerlines, and slopes. Up to six sides of a cube-shaped part may be inspected without repositioning the part.

In a typical operation, the part is placed on the table of the CMM at a random location. Generally, this location is approximately central to the machine axes to access all of the part surfaces to be inspected with the probe. Depending on the size of the part and the type of probe used, the part may need to be clamped to the machine table. If multiple inspections of similar parts are required, a reference location point may be established with a reference precision cube or sphere. The probe is then moved, manually or under machine control, until contact is made with desired part features. Reader heads, traveling on each axis along built-in axis measuring scales, transfer the instantaneous machine position through the digital display and to the computer interface. The dimensional and geometric elements may then be calculated, compared, and evaluated, or stored, or printed out as required.

Some of the advantages of using CMMs over conventional gaging techniques are flexibility, reduced setup time, improved accuracy, reduced operator influence, and improved productivity.

CMMs do not need to be dedicated to any single or particular measuring task. They can measure practically any dimensional characteristic of virtually any part configuration, including cams, gears and contoured surfaces.

Establishing part alignment and appropriate reference points are very time consuming with conventional surface-plate inspection techniques. These procedures are greatly simplified or virtually eliminated through software available on computer-assisted or computer-controlled CMMs.

Such software allows the operator to define the part's orientation on the CMM, and all coordinate data are subsequently automatically corrected for any misalignment between the part reference system and the machine coordinates. A CMM with sophisticated software can inspect parts in a single setup without the need to orient the part for access to all features even when a fourth axis (rotary table) is employed.

All measurements on a CMM are taken from a common geometrically fixed measuring system, eliminating the introduction and accumulation of errors that can result with hard-gage inspection methods and transfer techniques. Moreover, measuring all significant features of a part in one setup prevents the introduction of errors due to setup changes.

The use of digital readouts eliminates the subjective interpretation of readings common with dial or vernier-type measuring devices. Operator "feel" is virtually eliminated with modern electronic probe systems. All CMMs have canned software routines for typical part features, such as bores or center distances. In the part-program-assisted mode, the operator positions the machine; once the initial position has been set, the machine is under the control of a program that eliminates operator choice. In the computer numerically controlled (CNC) mode, motor-driven machines run totally unattended by operators. Also, automatic data recording, available on most machines, prevents errors in transcribing readings to the inspection report. This all adds up to the fact that less skilled operators can be readily instructed to perform relatively complex inspection procedures.

All the factors previously mentioned help to make CMMs more productive than conventional inspection techniques. Further dramatic productivity improvements are realized through the computational and analytical capabilities of associated data handling systems, including calculators and all levels of computers.

A variety of machine configurations are available from the manufacturers of CMMs. Each configuration has advantages that make it suitable for particular applications. A total of 11 different machine configurations exist; however, some of these configurations are modifications of one of the five primary configurations: cantilever, bridge, column, gantry, and horizontal arm.

The utility of a CMM depends largely on the nature of the probing device. Three types of probes are commonly used: (1) hard; (2) electronic, and (3) noncontact. A probe is selected according to the dimensional and geometrical requirements of the inspection process.

Various accessories used in conjunction with the probes enhance the capability of CMMs. For example, indexable probe heads permit orienting the measuring probe in horizontal and vertical planes to keep the probe normal to the plane desired. This feature gives the CMM the capability to reach and inspect geometrical elements that are not aligned to the machine axes. In addition, the use of indexable heads is generally required when inspecting and scanning complex surfaces. Indexable probe heads, however, tend to shrink CMM measuring volume.

A microprocessor control system is usually supplied with indexable heads to operate as a power drive and intelligent interface between machine control and indexing heads.

Rotary tables are especially useful when inspecting complex, multifaced parts or workpieces with a rotation axis such as cams, gears, and rotors. A variety of sizes are available to accommodate different size workpieces. Rotary tables expand CMM measuring volume.

Rotary tables can be controlled manually or automatically. When automatically controlled tables are used, special software programs interact with the machine controls to control table movement and provide misalignment compensation.

Besides their physical configurations, CMMs can also be classified according to their mode of operation: manual, manual computer-assisted, motorized computer-assisted, and direct computer controlled. Manual machines have a free-floating, solid or electronic or non-contact probe that the operator moves along the machine's coordinate axes to establish each measurement. Digital readouts, associated with each axis, provide the measurement values that the operator notes and records manually. In some instances, a simple digital printout device may be used to record the readings.

Manual computer-assisted CMMs use a data processing system to manipulate the measurements which are still made by manually moving the probe through a series of measurement locations. Solid or electronic or non-contact probes may be used on this type of machine. The data processing may be accomplished by a special microprocessor-based digital readout, a programmable calculator, or a full-fledged computer.

Depending on the sophistication of the data processing system and associated software, computer assisted CMMs perform functions ranging from simple inch to millimeter conversion to automatic three dimensional compensation for misalignment and a host of geometric and analytical measuring tasks. Storing of predetermined program sequences and operator prompting are also available to create part programs. The part program is generated and stored in the computer, which determines the inspection sequence and compares measured results with nominal values and tolerances for automatic GO, NOT GO decision making.

In effect, the computer system can carry out all the calculations and analyses required to arrive at dimensional and tolerance evaluations and can lead the operator through a prescribed series of positioning and measuring moves. Data recording is usually included with computer-assisted CMMs.

A motorized computer-assisted CMM has all the features of a computer-assisted CMM, but uses power-operated motions under the control of the operator, who uses a joystick. Most motorized CMMs also provide means for disengaging the power drive to permit manual manipulation of the machine motions. Some machines use direct-current servomotors and pneumatically operated friction clutches to reduce the effect of collisions, and most permit drive disengagement for manual movement.

Direct computer controlled (DCC) CMMs are equivalent to CNC machine tools. A computer controls all the motions of a motorized CMM. In addition, the computer also performs all the data processing functions of the most sophisticated computer-assisted CMM. Both control and measuring cycles are under program control. Most DCC machines offer various programming options, including program storage and, in some instances, off-line programming capability.

Beyond the microprocessor-based digital readouts, which were initially developed to provide basic measurement data processing capabilities for manual coordinate measuring machines, there is also a need to solve sophisticated measuring problems involving three-dimensional geometry and to provide more flexible general-purpose programming capabilities to solve special measuring problems. Many CMM manufacturers offer a series of data processing equipment for such purposes, including full DCC capability.

The key to the productivity of all forms of computer-assisted CMMs lies in the sophistication and ease of use of the associated software. Software is the most important element in any coordinate measuring system because its power determines how many part features can be measured and its ease of use determines the extent to which the machine is used.

The functional capabilities of CMM software depend on the number and type of application programs available. Virtually all CMMs offer some means of compensation for misalignment between the part reference system and the machine coordinates by probing selected points. Some machines are limited to alignment in one plane, while most machines provide full three-dimensional alignment. Once the designated points have been taken, the program calculates the misalignment and applies the appropriate correction to all subsequent measurement readings.

Conversion between Cartesian, polar, and, in some instances, spherical coordinate systems is also commonly handled. Most systems also calculate the deviation of measurements from nominal dimensions of the part stored in memory and flag out-of-tolerance conditions.

Geometric functions handled by the CMM software define geometric elements — such as points, lines, planes, cylinders, spheres and cones — from a series of point measurements and solve measurement problems dealing with the interaction of such geometric elements. Such software can determine, for example, the intersection of two circles established on the basis of a selected number of measurements or it can establish the angle of intersection of two surfaces.

Many software packages also provide a means for evaluating geometric tolerance conditions by determining various types of form and positional relationships (such as flatness, straightness, circularity, parallelism, or squareness) for single features and related groups of features.

Best-fit programs can identify the location of a part finished to size within a rough part from which it is to be made, to optimize the machining-allowance distribution: maximum material condition (MMC) programs evaluate features dimensioned according to MMC principles.

Other application programs include automatic part scanning for digitized profiles and a variety of special programs to handle the inspection of special shapes such as gears and cams. Statistical analysis software available provides for graphic data display, including histograms.

In the simplest form of CMM, a single transducer mounted parallel to each axis is able to determine the position of the probe tip relative to the datum point, which may conveniently be the point at which the axes intersect, or any other suitable location.

There are several possible sources of error if such a technique is employed. Lack of straightness in movement and of orthogonality of the axes are major sources of such errors. A further cause of error is the angular rotation of the carriages about axes perpendicular to their directions of movement. Such errors, often referred to as Abbe errors, depend not only upon rotation, but also upon the lateral offset between the probe tip and the transducer measuring in that dimension, and are obviously variable with that offset. Other sources of error exist, such as errors in the linear transducers themselves.

Many attempts have been made to compensate for error. For example, it is known to introduce a deliberate and known error into the transducers by various means. However, such corrections only apply for a given location in the measuring volume. An alternative technique is to "calibrate" the machine, measuring the errors existing at various points when the machine is actually used. As may be imagined, such a calibration process can be extremely lengthy, especially for a large machine and an enormous amount of storage is necessary.

One prior method for determining axis misalignment is as follows:

(a) positioning a granite cube on the CMM table with a first side aligned with the CMM X axis and then measuring the variation in the CMM-generated Y coordinate as the CMM probe is moved over the first side, then adjusting the cube position until no Y variation is produced.

(b) Move the CMM probe over a second side (perpendicular to the X axis) and measure the variation in the CMM-generated X coordinate. The ratio of the X coordinate variation to the Y coordinate variation is a measure of the misalignment between the CMM X and Y axes.

(c) Measure Y and Z axis misalignment by repeating steps (a) and (b), using appropriate sides of the granite block and substituting Y for X and Z for Y in steps (a) and (b).

(d) Measure X and Z misalignment by repeating steps (a) and (b), using another pair of sides and substituting Y for X and Z for Y.

In addition to being time-consuming, this granite square method is subject to errors caused by imprecise positioning of the granite square on the CMM table.

Another time-consuming method is used to measure axis scale errors and involves the use of a laser and the following steps:

(a) A reflector for a laser interferometer is attached to the CMM in place of the CMM probe.

(b) The Y and Z axes of the CMM are locked so that only movement along the X axis is allowed.

(c) A laser interferometer is aligned so that its beam travels parallel to the X axis and strikes the reflector.

(d) The reflector is then moved along the X axis of the CMM and CMM-generated X axis readings and the interferometer readings are obtained. From these readings the scale error in the CMM X axis can be determined.

(e) Steps a–d are then repeated for the Y and Z axes.

Also known are CMM inspection procedures which involve the use of artifacts such as the barbell and the Bryan Gauge. The data generated by the CMM during these procedures is used on a pass-fail basis. In other words, if use of the above artifacts indicates that adjustment is required, then the previously described granite block or laser interferometer procedures are used in making the needed adjustments.

Another method used to calibrate a CMM includes the steps of installing a CMM artifact on a CMM table, coupling the CMM probe to the artifact and storing a plurality of CMM-generated cartesian coordinate data points for a plurality of positions defined by the artifact. A data processor is programmed to generate a set of distance equations in terms of the CMM generated cartesian coordinates, a known diameter of the artifact and a plurality of unknown CMM axis alignment error and scale error factors. This set of equations is then solved for the unknown error factors, from which can be determined the necessary CMM adjustments. The CMM can then be properly aligned by making the indicated adjustments. In one version of this procedure, the artifact may be a ball bar. In another version, the artifact may be a Bryan Gauge. An example of this method is found in U.S. Pat. No. 4,437,151 issued Mar. 13, 1984 and entitled Coordinate Measuring Machine Inspection and Adjustment Method.

One method used for automatically calibrating an inspection device is to make calibration measurements of known geometic features such as hole depths. Correction functions are then calculated and stored. The correction functions are then applied to real-time measurements for the test part. This is similar to a CMM measuring a master part, storing data, and then computing deviations of the test part relative to the master. An example of this method is found in U.S. Pat. No. 4,462,082 issued July 24, 1984 and entitled Automatic Calibration System for Ultrasonic Inspection. Another prior art approach for applying software error compensation to a coordinate measuring machine is disclosed in the article entitled: "Error Compensation of Coordinate Measuring Machines" dated January, 1985 and published in the Annals of the CIRP by G. Zhang et al. The Zhang system is based on a rigid body model of workpiece motion in the machine coordinate frame. By taking a relatively small set of data for each axis, errors are computed throughout the full workzone. Squareness data is determined using linear displacement measurements along the machine diagonals. The error compensation computation is incorporated into the machine position reading subroutines to automatically produce compensated readings.

SUMMARY OF THE INVENTION

One advantage of the present invention is to provide an improved method and system for determining absolute position in the measuring volume of a CMM in an accurate fashion and at a relatively low cost.

Another advantage of the present invention is to provide method and system for determining the absolute position in the measuring volume of a CMM while allowing increased manufacturing tolerances for many individual components of the CMM and eliminating special means for mechanically adjusting the CMM to correct for geometry errors.

The method of the present invention includes the steps of storing sets of axis correction data for the full range of travel of an axis of motion and utilizing a positional feedback signal of the CMM to determine the subset of the axis correction data for a given position of a probe shaft of the CMM relative to the axis of motion. The method further includes the step of combining the positional feedback signal with the subset of axis correction data to obtain a corrected position signal in a standard coordinate frame.

The system of the present invention includes storage means for storing sets of axis correction data for the full range of travel of the axis of motion and means responsive to a positional feedback signal for determining a subset of the axis correction data for a given position of a probe of the CMM relative to the axis of motion. The system also includes means for combining the positional feedback signal with the subset of axis correction data to obtain a corrected position signal in a standard coordinate frame.

Preferably, the probe shaft of the CMM has three degrees of freedom representing axes of motion and the CMM includes feedback devices for providing a positional feedback signal for each of the axes of motion in the coordinate frame of the CMM.

Also, preferably, the method and system compensates for 21 different geometry errors of the CMM, but does not exclude additional geometry errors based on four, five or six-axes machines.

The advantages accruing to the above method and system are numerous. For example, absolute correction is provided for all geometry errors of the CMM. Also, probe offset compensation is provided.

The above advantages and other features of the present invention are readily apparent from the following detailed description when taken in connection with the accompanying drawings.

DETAILED DESCRIPTION OF THE INVENTION

FIG. 2 is a representation of the three dimensional coordinate system of the CMM of FIG. 1;

FIG. 3 is a block diagram of the system for automatically calibrating the CMM;

FIG. 9 is a set of equations to be solved to determine the corrected position within the measuring volume for a machine described in FIG. 1 whose axis coordinates are defined in FIGS. 7A and 7B; similar equations could be developed for other types of CMM configurations.

Figure 1:
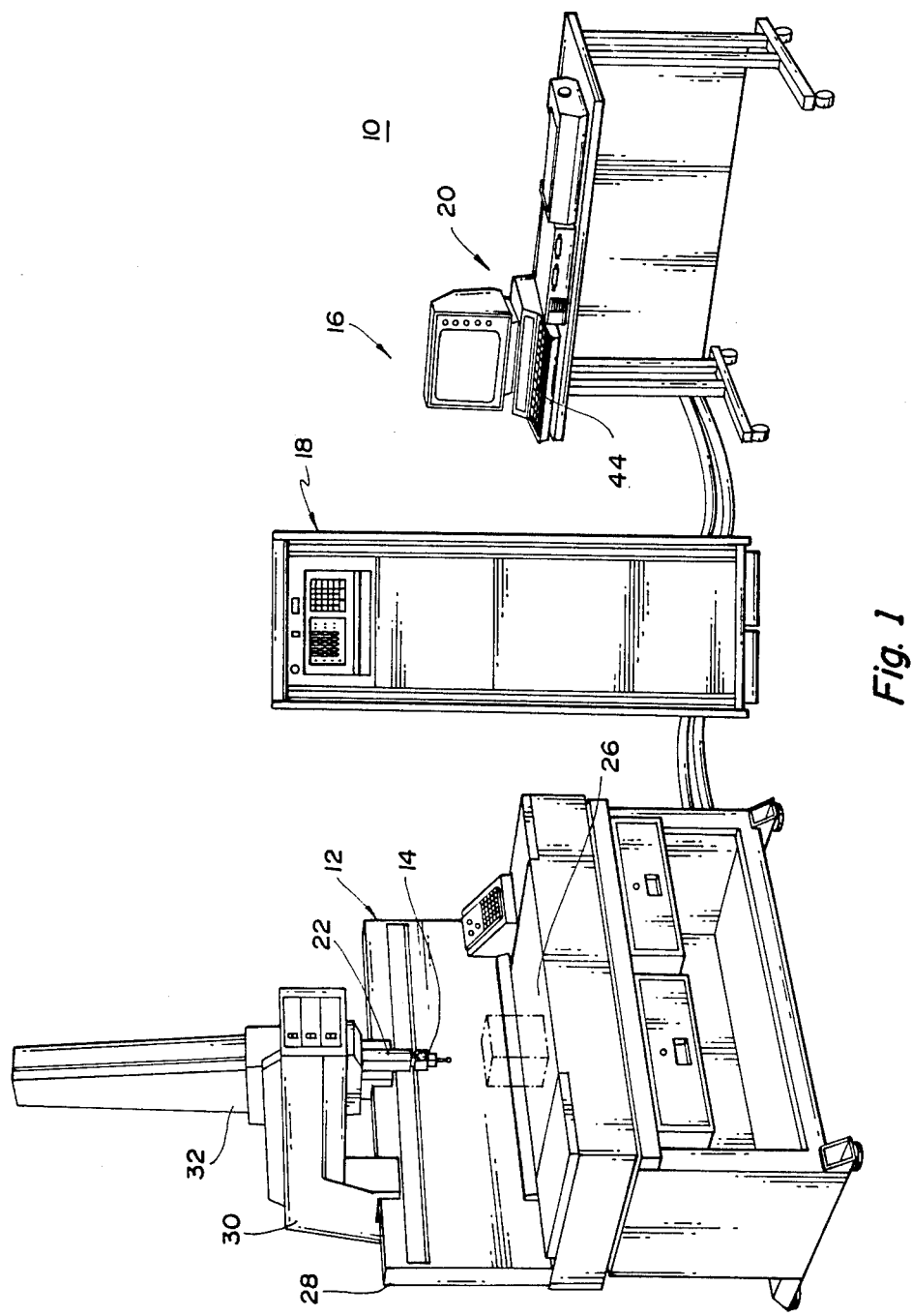
FIG. 1 is a perspective view of a typical CMM with which the present invention is utilized.

Referring to FIG. 1, there is illustrated a coordinate measuring machine (CMM) collectively indicated by reference numeral 10. The CMM generally includes an X-Y-Z positioning device, generally indicated at 12; a probe 14; and a control system, generally indicated at 16. The control system 16 includes a machine control, generally indicated at 18; computer hardware, generally indicated at 20; and software for programming the computer hardware 20.

The probe 14 is inserted into a Z-axis probe arm or shaft 22 of the device 12. The device 12 includes a base or work table 26 which contains tapped holes to facilitate the clamping and locating of parts.

The device 12 also includes a backrail 28 which slidably supports an X-axis carriage 30 by preloaded air bearings, which also guide the carriage 30.

An overhead Y-axis carriage 32 moves relative to the X-axis carriage 30 and is also supported and guided by preloaded air bearings on the X-axis. The probe shaft 22, in turn, moves relative to the Y-axis carriage 32 and is supported and guided thereon by preloaded air bearings.

While a conventional cantilever CMM has been described, it is to be understood that other types of CMMs may be utilized with the present invention based on a set of equations defined for the particular CMM being corrected.

Referring to FIG. 2, the X-Y-Z coordinate system depicted therein illustrates typical errors caused by angular rotation of the carriages 30 and 32 and the shaft 22 about the axes of the three axis system. Three such errors exist for each of the axes. Consequently, nine such errors exist for the coordinate system of FIG. 2 even though the mechanical components of the device 12 are manufactured and assembled in a highly accurate fashion. Because of these rotation errors and other errors, position error still exists as the device 12 is moved to different spots within its measuring volume 102 as shown in FIG. 7. Angular rotation errors about each of the axes are defined as follows: $A(x)$ =X-roll; $A(y)$ =Y-pitch; $A(z)$ =Z-pitch; $B(x)$ =X-pitch; $B(y)$ =Y-roll; $B(z)$ =Z-yaw; $C(x)$ =X-yaw; $C(y)$ =Y-yaw; and $C(z)$ =Z-roll.

Lack of straightness in movement along the axes of FIG. 2 is also a source of error. For each axis there typically exists a lack of straightness with respect to the other two axes, thereby resulting in six errors with respect to straightness of the device 12. Straightness errors are defined as follows: $X(y)$ =Y-straightness in X direction; $X(z)$ =Z-straightness in X direction; $Y(x)$ =X-straightness in Y direction; $Y(z)$ =Z-straightness in Y direction; $Z(x)$ =X-straightness in Z direction; and $Z(y)$ =Y-straightness in Z direction.

Although oftentimes a less serious source of error, axis scale errors can become significant. Such errors are defined as follows: $X(x)$ =scale errors in X; $Y(y)$ =scale errors in Y; and $Z(z)$ =scale errors in Z.

Another possible source of error is lack of orthogonality of the X,Y, and Z axes. Such error is typically given as the angular deviation from 90 degrees as follows: $P_{yx}$=y-x squareness; $P_{zx}$=z-x squareness; and $P_{zy}$=z-y squareness.

Consequently, it can be seen that there are 21 different geometry errors of the device 12, all of which, except for the squareness errors vary depending on the position of the device 12 within its measuring volume 102.

Figure 7A:
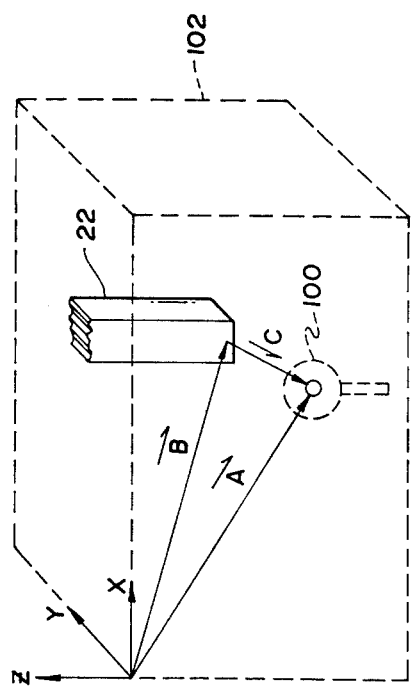
FIGS. 7A and 7B illustrate the three-dimensional coordinate system and measuring volume of the CMM of FIG. 1, together with a probe subcoordinate system.
Figure 7B:
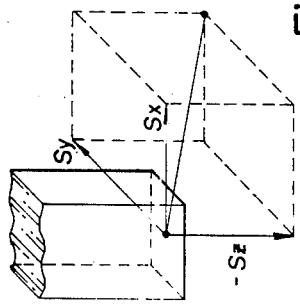

Finally, another possible source of errors are probe offset errors, which are determined from the angular errors and probe offsets, $S_x$, $S_y$ and $S_z$ of FIG. 7B. The probe 14 is used to measure the center position of a sphere 100. Probe offsets are then determined by vector subtraction of vectors A and B of FIG. 7A.

Referring now to FIG. 3, there is illustrated in block diagram form a system for calibrating the CMM 10. The system 10 includes calibration equipment 32, such as a laser interferometer with linear, angle and straightness optics. Preferably, the laser comprises an HP 5528A laser. The calibration equipment 32 also includes electronic levels with a level meter and an A to D HPIB interface. The calibration equipment 32 further includes a ball bar as well as a vertical straight edge and probe. Preferably, the electronic levels comprise Wyler electronic levels and the probe comprises a Renishaw TP-2, PH-6 probe, including a 200 millimeter extension. Finally, the calibration equipment 32 includes probe adaptors for the laser optics, the level and the PH-6 probe.

The calibration equipment 32, in general, is used by factory personnel to measure the CMM geometry and scale errors and automatically transfer that information to a computer 34 through the HPIB interface. Preferably, the computer 34 comprises an HP-207 computer including a printer and an approximate communications link to permit the computer 34 to communicate with the other components of the system. In general, the computer 34 stores the calibration data and computes/stores axis correction data. Furthermore, the computer 34 transfers data to a measurement processor (MP) 36 of the control system 16 and to a disc 38. Axis position data and data record commands from the MP 36 are transferred to the computer 34 during the calibration process.

The system of FIG. 3 also includes a data record switch 37, which preferably comprises a handheld button switch which interfaces to the MP 36 to signal the MP 36 to record information which the MP 36 is receiving from the rest of the CMM 10. The resulting axis correction data on the disc 38 is transferred to memory within the MP 36 through the computer 34 for use during operation of the CMM 10. The information on the disc 38 can also be printed out into a final report for maintaining in a quality control file 40.

Figure 4A:
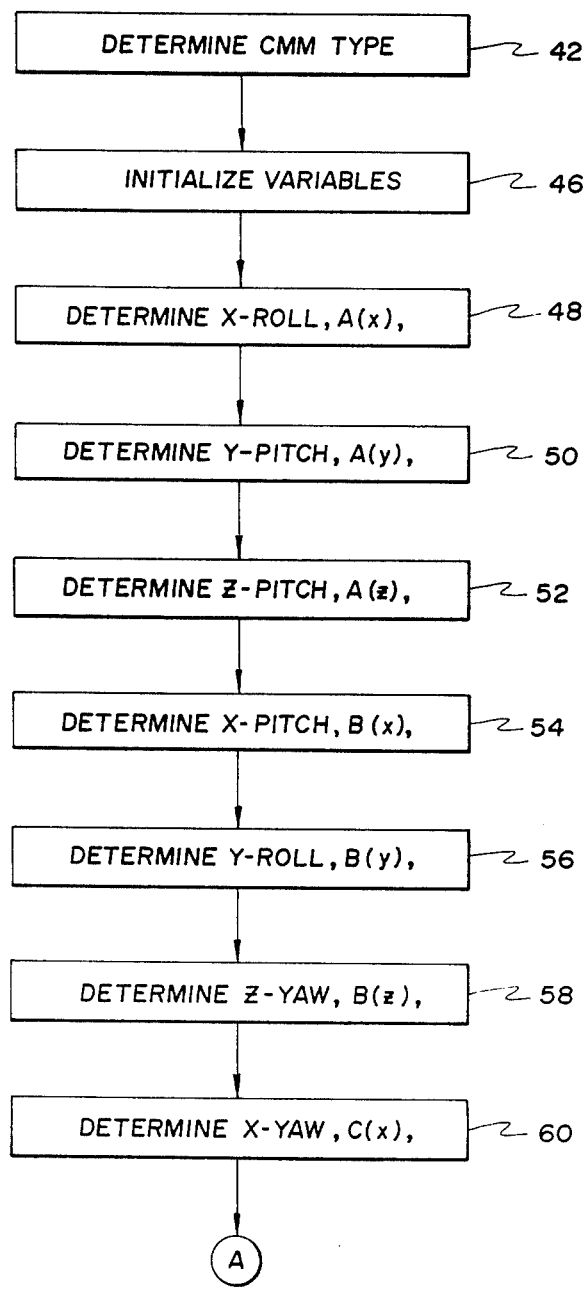
FIGS. 4A through 4C is a flowchart illustrating the various steps taken by the system of FIG. 4 to calibrate the CMM.
Figure 4B:
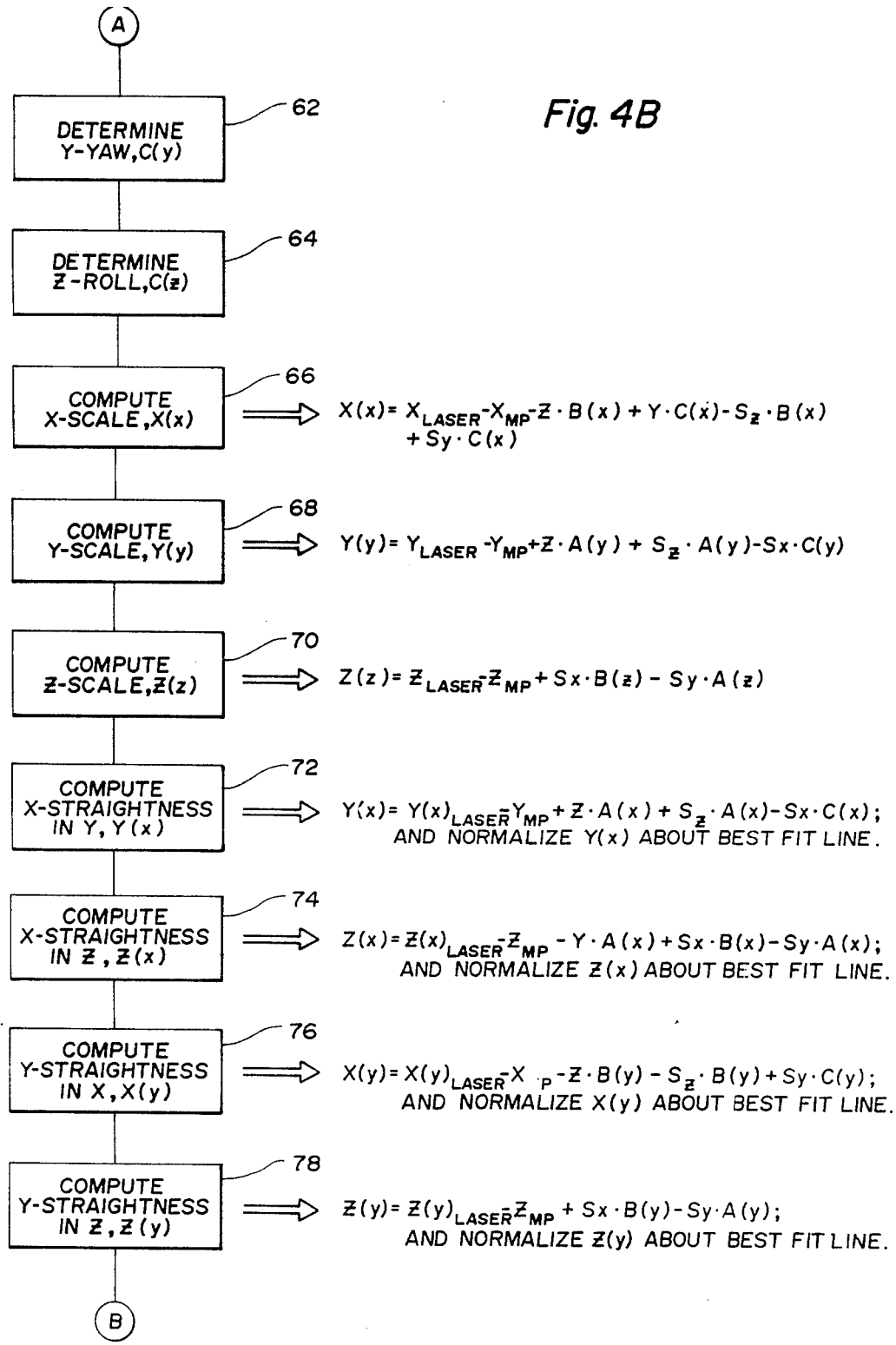
Figure 4C:
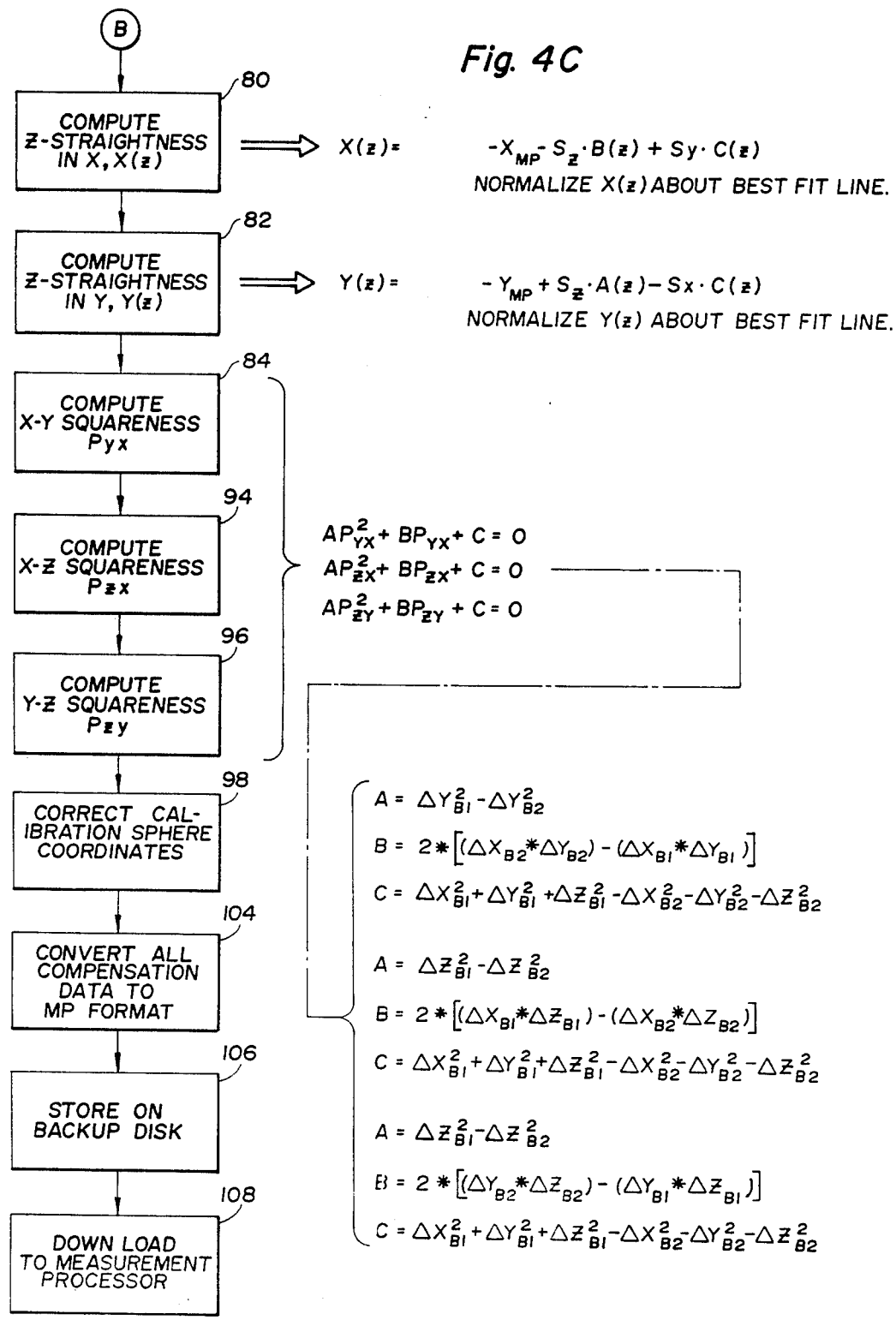

Referring now to FIGS. 4A through 4C, these are illustrated in flowchart form, the various steps taken by the system of FIG. 3 in order to calibrate the CMM 10. However, preferably, before the actual calibration procedure is performed, verification of machine function, ranges, axis friction and repeatability is made.

In block 42, the individual calibrating the CMM 10 indicates the type of CMM which is being calibrated. For example, the CMM 10 illustrated in FIG. 1 is of a cantilever design. Typically, data is input into the control system 16 by the operator, such as by typing that information into a keyboard 44 of the computer 20.

In block 46, all of the variables utilized during the calibration process are initialized, such as measurement intervals and the like.

During the initialization process of blocks 42 and 46, the computer system 20 assists the operator to enter the particular model number, machine serial number and date into the system 20. The computer system 20 also instructs the operator to place the end of the probe shaft to machine position 0,0,0. The extent of machine axis travel is stored relative to the particular model number.

In general, for each of the following error calibration steps illustrated by the remaining blocks in FIGS. 4A through 4C, procedural requirements for the calibrating operator are displayed on the screen before the data is taken. Such requirements typically list the calibration equipment required, the particular setup (which may include reference to a manual) and the operator steps required to obtain the data.

In block 48, the amount of X-roll given by the mathematical symbol, $A(x)$, is determined by using the electronic levels in a conventional fashion along every 50 millimeters of X axes movement with the Y and Z axes of the device 12 locked so that movement only along the X axis is allowed. In the example of FIG. 1 the device 12 is preferably automatically moved under control of the machine control 18 along 50 millimeter intervals on the X axis. Correspondingly, at each 50 millimeter interval, the MP 36 provides to the computer 34 the exact location in the machine coordinate system at which the measurement was taken. In this way a table of X-roll data as a function of the X position is generated.

In block 50, the error, Y-pitch, given by the mathematical symbol, A(y), is determined by first attaching an angular reflector for the laser interferometer to the device 12 in place of the CMM probe 14. The X and Z axes of the device 12 are then locked so that only movement along the Y axis is allowed. The laser interferometer is aligned so that the beam travels parallel to the Y axis and strikes the reflector. The reflector moves along the Y axis of the device 12. CMM-generated Y axis readings and the interferometer readings are obtained at every 50 millimeter intervals under control of the machine control 18. In this way, a similar table of data is generated for Y pitch for the entire range of travel of the Y axis.

In block 52, the Z-pitch error data, A(z), is determined in much the same fashion as the X roll error data was obtained in block 48. The electronic levels are used to obtain the error data along every 50 millimeters of Z axis travel for the entire range of Z axis motion.

In block 54, X-pitch error data, B(x), is determined for every 50 millimeters along the X axis by use of the laser angular interferometer to thereby generate the table of error data.

In block 56, the Y-roll error data, B(y), is determined with the electronic levels for every 50 millimeters of Y axis movement.

In block 58, the Z-yaw error data, B(z), is determined for every 50 millimeters of Z axis movement with the electronic levels.

In block 60, X-yaw error data, C(x), is determined for every 50 millimeters of X axis movement with the laser angular interferometer.

Referring now to FIG. 4B, in block 62, Y-yaw error data, C(y), is determined for every 50 millimeters along the Y axis by utilizing the laser angular interferometer.

In block 64, the Z-roll error data, C(z), is determined for every 50 millimeter of Z axis movement utilizing the vertical straight edge, touch probe and probe extensions.

The data obtained in blocks 48 through 64 are typically measured in arc seconds and are preferably converted into radians before being stored in tabular form so that the data can be used in calculations as will be apparent hereinbelow.

In block 66, X-scale error data, X(x), is determined for each 25 millimeters of movement along the X axis by use of the laser linear interferometer at some convenient Y, Z position (preferably table level). The $X_{laser} - X_{mp}$ data is then corrected to Z = 0, Y = 0 positions as shown by the equation immediately adjacent block 66. In this way, a table of X scale data is generated and stored.

In block 68, a table of Y-scale error data is generated in a similar fashion as the X-scale error data was generated in step 66 by utilizing readings from the laser linear interferometer taken at 25 millimeter intervals along the entire Y axis.

In block 70, the Z-scale error data is computed by utilizing readings from the laser linear interferometer and the CMM-generated Z axis readings to thereby form the tabular Z-scale error data for every 25 millimeters of Z axis movement.

In block 72, X-straightness in Y error data, Y(x), is determined through the use of the laser straightness interferometer which provides readings along every 50 millimeters of X axis movement at some convenient Z position (preferably table level). The $Y(x)_{laser} - Y_{mp}$ data is then corrected to Z = 0 position as shown by the equation immediately adjacent block 72. After the tabular data for X-straightness in Y is generated by solving the equation adjacent block 72, a least squares, best fit line is fitted to the data points and the distance of the data points from the line is determined, thereby normalizing Y(x) about the best fit line.

In blocks 74, 76 and 78, X-straightness in Z error data, Y-straightness in X error data and Y-straightness in Z error data respectively, are generated or computed in the same fashion as the X-straightness in Y error data was generated in block 72. Similarly, the error data in blocks 74, 76 and 78 are normalized about a best fit line as was done in block 72.

Referring now to FIG. 4C, in block 80 Z—straightness in X error data, X(z) is determined along 50 millimeter measurement intervals along the Z axis by utilizing the straight edge and probe. Utilizing the laser straightness interferometer results in limited Z travel. Consequently, the Z-straightness in X error data is a function of the X axis reading from the measurement processor 36, $X_{mp}$ measuring a straight edge with touch probe; and, the product of the Z axis probe offset and the Z-yaw error data for the corresponding Z axis reading, $S_z \cdot B(z)$ and $S_y \cdot C(z)$. Similarly, after the equation adjacent the block 80 has been solved, a least squares, best fit line is fit to the resulting data points and the distance of the data points from the best fit line is computed and thereafter stored in tabular form.

In like fashion, in block 82 the Z-straightness and Y error data, Y(z) is computed in a similar fashion as that computed in step 80.

Figure 5A:
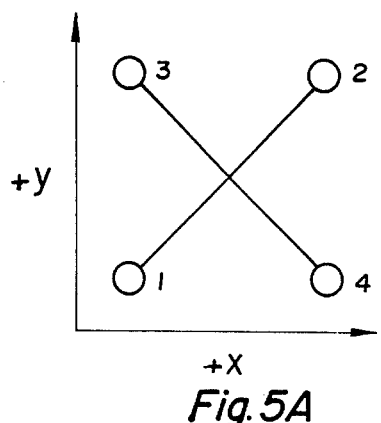
FIGS. 5A through 5C illustrate two different positions of an artifact, such as a ball bar, in each of the coordinate planes of the CMM.
Figure 6:
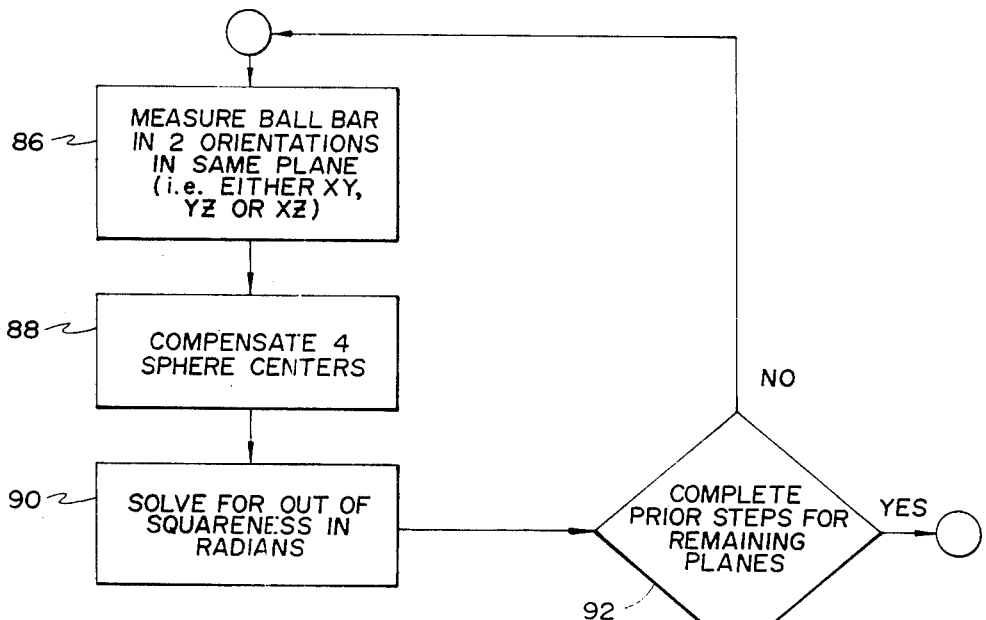
FIG. 6 is a flowchart illustrating the various operating steps taken to determine the squareness of the CMM.

In block 84, the X-Y squareness error data, $P_{yx}$, is determined from the solution to the quadratic equation indicated in FIG. 4C. The values for A, B and C of the quadratic equation are given by the first set of equations for A, B and C and are derived in the following fashion. With reference to FIG. 5A and FIG. 6, in step 86 the ball bar is placed in two orientations in the X-Y plane at approximately 90 degrees from each other. During a measurement step 86 the centers of the spheres at the ends of the ball bar are computed in order to determine the length of the ball bar in each of the orientations.

In block 88, the four sphere centers are compensated by using the previously computed compensation data.

In block 90, the length of the ball bar in each of the orientations is equated to each other. When this is done, the X-Y squareness factor becomes a quadratic equation as previously indicated. The solution to the quadratic equation determines the X-Y squareness factor, $P_{yx}$, in radians, as indicated in block 90.

Figure 5B:
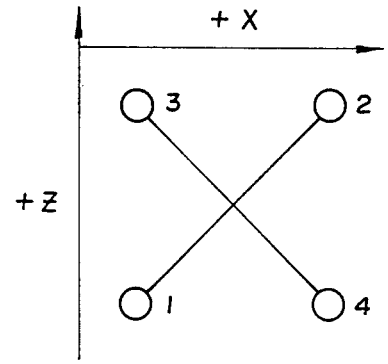

In block 92, as indicated in FIG. 6, after the X-Y squareness factor is determined, the X-Z squareness factor $P_{zx}$ of step 94 is then computed. The middle set of A, B, and C equations is utilized to solve the quadratic equation to determine the X-Z squareness. With further reference to FIG. 5B, the ball bar is placed in two different orientations in the X-Z plane and blocks 86, 88, 90 and 92 are repeated.

Figure 5C:
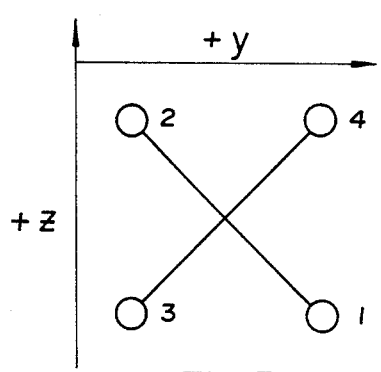

In block 96, the Y-Z squareness factor, $P_{zy}$, is computed in the same fashion by placing the ball bar in two different orientations in the Z-Y plane as indicated in FIG. 5C. The lowermost set of A, B and C equations is utilized in order to solve the quadratic equation to determine the Y-Z squareness factor.

In block 98, calibration sphere coordinates are determined by first mounting the touch probe 14 at a known distal end of the probe shaft 22. A calibration sphere 100 is screwed into the worktable 26 at a preselected location within the measuring volume 102 of the device 12. The positioning device 12 is then moved so that the probe 14 touches the sphere 100 at a number of different points. Sphere coordinates are determined by vector addition of vectors B and C wherein vector A equals vector B plus vector C as indicated in FIG. 7A.

Referring again to FIG. 4C, in block 104 all of the previously computed compensation data is converted to a format for use by the measurement processor 36.

In block 106, the data is then stored on the backup disc 38.

In block 108, the data is also down-loaded to memory 110 within the measurement processor 36 which is utilized by the measurement processor 36 during operation of the CMM 10 to compensate the CMM 10 for the entire measuring volume 102 thereof.

One of ordinary skill in the programming arts could prepare a computer program to perform the above calibration functions from the above description and drawings without undue experimentation.

Figure 8:
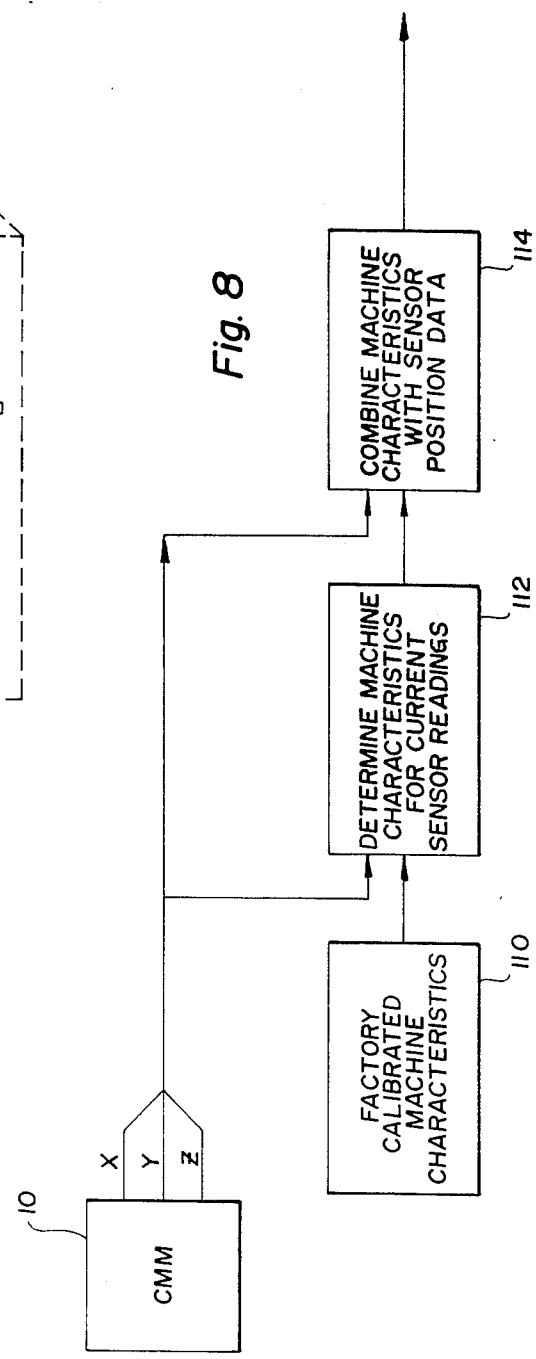
FIG. 8 is a block diagram illustrating the method and system for determining position within the measuring volume of the CMM.

Referring now to FIG. 8, there is illustrated a method and system for utilizing the previously stored, factory calibrated machine characteristics or error data in order to determine the absolute position of a point in the measuring volume 102 of the device 12. In general, the factory calibrated machine characteristics stored within the measurement processor 36 characterizes the motion of the X, Y and Z axes in terms of its deviation from a theoretically true axis system. As previously mentioned, there are 21 possible geometric errors which have been previously calibrated. The relative effect of any one of these errors on system performance varies with different machine configurations and even among different machines of the same configuration.

Through appropriate software the measurement processor 36 is interfaced with the CMM 10. Block 110 represents the memory of the MP 36 in which the factory-calibrated machine characteristics or axis correction data are stored in tabular form. In block 112, the measurement processor 36 determines the machine characteristics for current sensor readings by capturing the actual position information from each machine axis sensor and uses this to locate information in the tables describing the machine characteristics in that particular position.

In block 114, the measurement processor 36 mathematically combines machine feedback or position sensor signal and the characteristic axis correction data to produce a corrected set of coordinate values which describes the position of the probe 14 in a true Cartesian coordinate system.

Referring now to FIG. 9 there are illustrated the different mathematical equations which are solved to obtain the corrected X, Y and Z position. For example, the corrected X readout signal is a function of: the uncorrected value of the X readout, $X_{mp}$; the X scale error data for the particular value of X, $X(x)$; Z-straightness in X error data, $X(z)$; Y-straightness in X error data, $X(y)$; the product of corresponding value of Z and the sum of the X-pitch error data, the Y-roll error data and the Z-Y squareness factor, $Z[B(x) + B(y) + P_{zx}]$; the product of the uncorrected Y value and the sum of the Y-yaw error data and the X-Y squareness factor, $Y[C(x) + P_{yx}]$; the product of the Z component of the probe offset and the sum of the X-pitch error data, the Y-roll error data and the Z-yaw error data, $S_z[B(x) + B(y) + B(z)]$; and the product the Y component of the probe offset and the sum of the X-yaw error data, the Y-yaw error data and the Z-roll error data, $S_y[C(x) + C(y) + C(z)]$. In like fashion, the corrected Y and Z values are computed as indicated by the remaining two equations in FIG. 9.

The advantages accruing to the use of the present invention are numerous. For example, a more accurate CMM can be obtained at lower cost. Also, the system eliminates many manhours of final machine assembly in fine tuning the machine mechanically for accuracy as well as allowing increased manufacturing tolerances for many individual components of the CMM.

We claim:

1. A method for determining the absolute position of a point in the measuring volume (102) of a CMM (10) having a probe shaft (22) and a probe (14) supported on a distal end of the probe shaft, the probe shaft having three axes of motion (X, Y, Z), the CMM including devices for providing a position signal in determining the position of the probe for each of the axes of motion in a coordinate frame of the CMM, and control means (36) for receiving the position signals and for providing a coordinate measurement signal which identifies the position of the probe, the method including the steps of storing (108) sets of axis correction data to compensate for CMM geometry errors for a range of travel in each of the axes; and determining (112) a subset of the axis correction data for a given position of the probe shaft relative to each of the axes of motion as a function of the position signals; wherein the improvement comprises:

the step of storing (108) includes storing the axis correction data in storage means of a measurement processor included in the control means;

the step of determining includes determining compensated rotation data (48 through 64) representing the amount of angular rotation about each of the axes for each of the axes; squareness data (84, 94, 96) representing the orthogonality of three different pairs of the axes; normalized straightness data (72 through 82) for each of said axes with respect to each of the other axes; and scale error data (66, 68, 70) representing error in each of the devices; and wherein the improvement further comprises the steps of:

measuring the position of an artifact with the CMM by moving the probe of the CMM so that each of the devices provides an artifact position signal and the measurement processor provides a corresponding measurement signal as a function of the artifact position signals;

calculating probe offset data (98) as a function of the measured position of the artifact, the probe offset data representing the offset of the probe from the probe shaft along each of the axes;

storing the probe offset data in the storage means of the measurement processor;

retrieving the probe offset data from the storage means;

determining compensated probe offset data as a function of the probe offset data and respective compensated rotation data; and modifying (114) the position signals from the devices as a function of the compensated probe offset data and the subset of axis correction data including the compensated rotation data, the squareness data, the normalized straightness data and the scale error data, the step of modifying being performed immediately after the step of determining (112) the subset of axis correction data to obtain a corrected position signal in a standard coordinate frame.

2. The method as claimed in claim 1 wherein said corrected position signal has a component representing a corrected position along each of the axes and wherein each of said components is a function (FIG. 9) of the product of its respective compensated rotation data and the position signal of one of the other axes.

3. The method as claimed in claim 2 wherein at least one of said components is a function (FIG. 9) of the product of its respective squareness data and the position signal of one of the other axes.

4. The method as claimed in claim 3 wherein each of said components is a function of the normalized straightness data in its respective axis.

5. The method as claimed in claim 4 wherein each of said components is a function of the scale error data for its respective axis.

6. The method as claimed in claim 1 wherein the artifact comprises a calibration sphere (100) and wherein the step of measuring includes the step of coupling he probe to a plurality of positions on the sphere.

7. A system for determining the absolute position of a point in a measuring volume (102) of a CMM (10) having a probe shaft (22) and a probe (14) supported on a distal end of the probe shaft, the probe shaft having three axes of motion (X, Y, Z), the CMM including devices for providing a position signal in determining the position of the probe for each of the axes of motion in a coordinate frame of the CMM, and control means (36) for receiving each of the position signals and for providing a coordinate measurement signal which identifies the position of the probe, the system including storage means (110) for storing sets of axis correction data to compensate for CMM geometry errors for a range of travel in each of the axes; means for determining (36 and 112) a subset of the axis correction data for a given position of the probe shaft relative to each of the axes of motion as a function of the position signals; and an artifact, wherein the improvement comprises:

said means for determining determines compensated rotation data (48 through 64) representing the amount of angular rotation about each of the axes for each of the axes; squareness data (84, 94, 96) representing the orthogonality of three different pairs of the axes; normalizes straightness data (72 through 82) for each of said axes with respect to each of the other axes; and scale error data (66, 68, 70) representing error in each of the devices;

each of the devices provides an artifact position signal upon moving the probe of the CMM to the artifact;

the control means of the CMM includes a measurement processor which provides a corresponding measurement signal as a function of the artifact position signals; and calculating means for calculating probe offset data as a function of the measured position of the artifact, the probe offset data representing the offset of the probe from the probe shaft along each of the axes; wherein the storage means stores the probe offset data; and wherein the measurement processor determines compensated probe offset data as a function of the probe offset data and its respective compensated rotation data, and the measurement processor modifies the position signals from the devices as a function of the compensated probe offset data and the subset of axis correction data including the compensated rotation data, the squareness data, the normalized straightness data and the scale error data to obtain a corrected position signal in a standard coordinate frame.

8. The system as claimed in claim 7 wherein the artifact comprises a calibration sphere (100).

* * * * *